US006067722A

United States Patent [19]
Goodyer et al.

[11] Patent Number: 6,067,722
[45] Date of Patent: *May 30, 2000

[54] MARKING TAPE

[76] Inventors: Robert B. Goodyer, 46 Mountain View Cr., London, Ont., Canada, N6J 4M6; Mark Piggot, 21 Rathgar Street, London, Ontario, Canada, L5Z 1Y3

[ * ] Notice: This patent is subject to a terminal disclaimer.

[21] Appl. No.: 09/361,139

[22] Filed: Jul. 27, 1999

Related U.S. Application Data

[63] Continuation of application No. 08/839,881, Apr. 16, 1997, Pat. No. 5,953,826.

[51] Int. Cl.[7] ....................................................... G01B 3/10
[52] U.S. Cl. .................................. 33/758; 33/757; 33/759
[58] Field of Search ............................. 33/758, 757, 759, 33/755, 483, 493

[56] References Cited

U.S. PATENT DOCUMENTS

| | | | |
|---|---|---|---|
| 2,177,627 | 6/1939 | Drew | 33/758 |
| 2,742,705 | 4/1956 | Gelardi | 33/137 |
| 3,664,026 | 5/1972 | Lawson | 33/759 |
| 4,149,320 | 4/1979 | Troyer et al. | 33/137 |
| 4,202,925 | 5/1980 | Dabroski | 428/219 |
| 4,217,379 | 8/1980 | Salvador | 427/272 |
| 4,351,113 | 9/1982 | Eggertsen et al. | 33/137 |
| 4,367,590 | 1/1983 | Winter et al. | 33/137 |
| 4,425,391 | 1/1984 | Wilson | 428/43 |
| 4,599,260 | 7/1986 | Truskolaski et al. | 428/207 |
| 4,708,755 | 11/1987 | Lambelet | 156/64 |
| 4,827,621 | 5/1989 | Borsuk | 33/758 |
| 4,845,858 | 7/1989 | Thomas | 33/759 |
| 4,942,670 | 7/1990 | Brandt | 33/494 |
| 5,012,590 | 5/1991 | Wagner et al. | 33/759 |
| 5,038,492 | 8/1991 | Bryant et al. | 33/758 |
| 5,107,601 | 4/1992 | Semchuck | 33/759 |
| 5,460,880 | 10/1995 | Patnode et al. | 428/354 |
| 5,482,753 | 1/1996 | Langan et al. | 428/42 |
| 5,486,574 | 1/1996 | Himes et al. | 525/314 |
| 5,492,599 | 2/1996 | Olson et al. | 162/137 |
| 5,522,199 | 6/1996 | Pearce | 52/749.1 |

*Primary Examiner*—Diego Gutierrez
*Assistant Examiner*—Maria Fernandez

[57] ABSTRACT

A marking tape having a plain paper body. The body is dimensionally stable and rippable, with the paper being flexible, but stiff enough to retain a fold therein. The tape has a first surface with a plurality of relative measurement markings and a second surface with an adhesive applied thereto. The first surface is also treated with a release agent, to permit the adhesive layer to release from said first surface when formed into a roll. A longitudinal bending feature is provided, in the form of a score or razor cut which facilitates placement of the marking tape onto a material to be marked.

3 Claims, 1 Drawing Sheet

MARKING TAPE

This is a continuation application of U.S. patent application Ser. No. 08/839,881, filed Apr. 16, 1997 now U.S. Pat. No. 5,953,826.

FIELD OF THE INVENTION

This invention relates generally to the field of building construction and carpentry of the sort that is particularly used in North America in the construction of single or multiple family dwelling units that are built from a frame construction. More particularly this invention relates to a measuring aid that may be used to assist both skilled and unskilled workmen in the construction of such dwellings or in other general construction projects.

BACKGROUND OF THE INVENTION

In many construction applications there is a need for measuring building components before they are installed. In this sense, many of the construction components are custom sized or fit into a particular location. This is true for all manner of materials used in a typical construction project. For example, it may be necessary to measure the distance between two walls to determine the required length for a stud wall. Once the stud wall is erected it may be necessary for the builder to measure panels of drywall to cover the surface which may not even be rectangular. In most cases the workers will carry metallic non-disposable measuring tapes which can be used on the job site to make spot measurements of building materials.

However, there are many disadvantages to such steel measuring tapes. While they are quite durable, they are only temporarily placed against the workpiece and then retracted and stored until needed the next time. The act of retracting and storing the tape can result in the person making the measurement forgetting what was measured, requiring the measurement step to be repeated. Additionally for longer spans, it is necessary for two people to be present so that one can hold the far end of the tape onto the workpiece and the other can read off the measurement, or make an appropriate mark on the workpiece for cutting or the like. The need for two people is awkward and labour intensive.

In the past the problems of such steel tape measures have been recognized and various efforts to provide disposable pressure sensitive adhesive backed marking tapes have been made. Such a tape can be stuck onto a workpiece by one person, and left there to provide easy measuring. For example, U.S. Pat. No. 4,351,113 addresses many of the concerns associated with steel tape measures and discusses a number of criteria for adhesively backed measuring tapes. These include accuracy, tensile strength, adhesion strength, markability, elasticity, and cost. To meet these criteria the patent teaches a tape made from a creped paper base which has a fibrous organic nature. In this manner the tape of this invention is susceptible to stretching forces to conform to small irregularities in the surface to which it is applied, without wrinkling or changing direction.

While there are certain advantages to the invention taught by this prior patent the disadvantages are significant. Most particularly there is a concern with accuracy. Although creped paper of the sort described will allow some stretching to accommodate surface irregularities, is also not dimensionally stable. Depending upon how much tension is applied to the tape at the point of application to any surface the tape will stretch to a greater or lesser extent. Any grid printed on the tape will also stretch. This causes measurements based upon the grid of the tape to be off. If the measurements are not accurate, they might just as well not be made at all. The patent attempts to address this by printing a set of false indicia which when stretched by the average person will become dimensionally correct. Unfortunately this is impractical in practice as not everyone will use the same force to lay the tape, nor is it even likely that a single person will use the same force in laying out the tape at different times during the same day.

Another problem facing printed tapes are to form a good set of reference or measurement marks on the upper surface. Conventional tapes are impregnated with a release agent to facilitate the easy unwinding of a length of tape from a roll. Without a release agent on the upper surface, the tape adhesive will stick to the upper surface causing the tape to rip or tear rather than coming cleanly free. Unfortunately, application of the release agent can interfere with the printing ink being able to set to the tape surface. There is a tendency for the image to bleed or to lift off with the overlying adhesive layer. Either event can cause the markings to be obliterated rendering the tape virtually useless for measuring purposes. This problem was addressed in U.S. Pat. No. 4,599,260, where the patent teaches applying an adhesive to one face of the tape and a low adhesion backside coating and an ink adhesion promoter to the other face. Unfortunately this requires a number of manufacturing steps and is awkward to reliably implement.

Other printed tapes have been proposed, with various types of markings, but none have met with commercial success. Examples of these prior patents include: U.S. Pat Nos. 4,708,755; 4,845,858; 4,942,670; 5,012,590: and 5,107,601. Each of these prior patents teaches a tape which attempts to overcome the problems, but none of them have met the concerns of the marketplace.

SUMMARY OF THE INVENTION

Thus, what is desired is an adhesively backed measuring tape that has the desired properties, such as dimensional stability, is easily tearable across the tape but has sufficient tensile strength not to be broken when being applied and is easily markable with pencils or pens. Most preferably the tape would be easy to apply to surfaces and even around corners to facilitate mounting building materials, cabinet making or the like.

Therefore, there is provided a marking tape comprising:
  a body having a first surface and a second surface, the body being comprised of plain paper which is dimensionally stable and rippable, the paper being of the type that is flexible, and sufficiently stiff to retain a fold therein;
  said first surface including a plurality of relative measurement marks made thereon, and being treated with a penetrating release agent;
  said second surface including an adhesive layer disposed thereon, said adhesive layer releasing from said release agent without removing said relative measurement marks; and
  a longitudinal bending means in said body sized and shaped to permit said body to be bent along a longitudinal axis to form a self supporting fold to facilitate placement of said marking tape onto a material to be marked.

BRIEF DESCRIPTION OF THE DRAWINGS

Reference will now be made, by way of example only, to preferred embodiments of the invention as depicted in the accompanying drawings and in which.

DETAILED DESCRIPTION OF THE PREFERRED EMBODIMENTS

Figure 1:
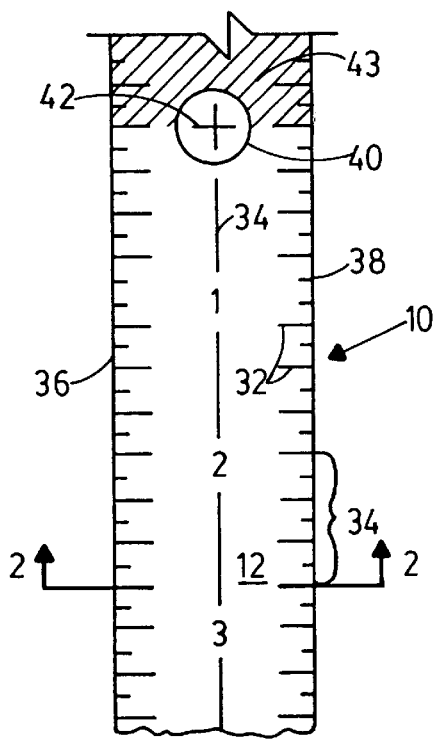
FIG. 1 is a top plan view of a tape marked according to the present invention.
Figure 4:
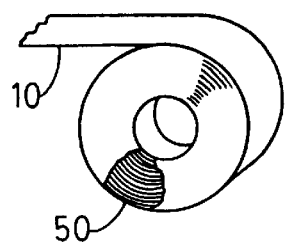
FIG. 4 is a length of measuring tape wound around a core.

FIG. 1 shows a marking tape indicated generally as 10. The marking tape has a top surface 12 which includes a plurality of markings as explained below.

Figure 2:
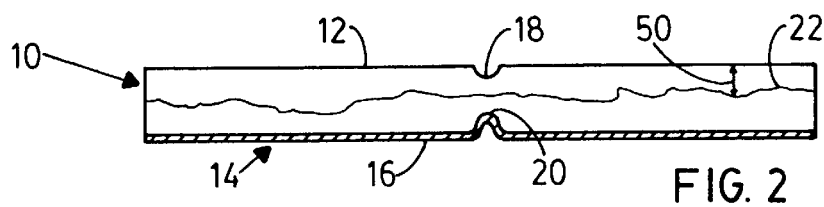
FIG. 2 is an enlarged cross-sectional view along line 2—2 of FIG. 1.

FIG. 2 is an enlarged cross-sectional view of the marking tape 10 of FIG. 1 which shows the top surface 12, and a bottom surface 14. A layer of adhesive material 16 is shown on the bottom surface 14. Also shown is a top centre score 18 on the top surface 12, and a bottom centre score at 20 on the bottom surface 14.

A release agent 22 is shown partially penetrating the body of the marking tape 10.

Turning to FIG. 1, it can be seen that there are marks 32 printed on the top surface of the marking tape 10. The form shown in FIG. 1 is for inches, and is marked in 16ths of an inch. However, the markings could be made metric, or more finely such as 32nds of an inch is desired. For accurate measuring purposes, a plurality of gradations, shown as 32 are made on the outer edge 34 of the marking tape 10. Most preferably, the markings 32 are formed on both sides 36, 38 of the tape, as shown in FIG. 1. This facilitates cutting, or other actions involved with the side edges of the tape 10.

Also, there is provided a centre line marking 39, which facilitates the placement of the tape 10. Also, there is shown a circle 40, with a cross-hair 42, formed therein. This circle is intended to indicate a larger unit of measure than the smaller inch, for example a foot demarcation. It is to be noted that above the circle 42 the tape has been shaded at 43. Alternate larger lengths of the tape will be formed darker and lighter to facilitate measuring longer distances and estimating the number of feet for example of a given material marked with the marking tape 10 at a distance.

It is also to be noted that there are no larger unit measurement numbers, such as feet numbers, indicated on the tape 10. This is because once the tape 10 is positioned, it will be zeroed at one end or another. Then, the feet measured from any given starting point or zero point can be simply written onto the tape 10 in the circles 40 by the person using the tape 10. Thus, the markings 32 provided on the tape 10 are relative markings only and the number of feet or metres would not be preprinted on the tape 10.

It can now be appreciated that the preferred form of the tape 10 is one that is easily marked by pen or pencil, in order to put the specific markings on the tape 10 as required once the zero point is established. Reasonable results have been obtained by using a plain paper tape 10. Plain paper has a number of desirable properties for this purpose. Firstly. plain paper is dimensionally stable, does not, as crinolated tapes do, stretch when being applied. Thus, it is possible to apply the tape 10 with a dimensional accuracy to a material. Further, the tape is relatively rigid across its length, and thus will not tend to sag or bend laterally, when being applied to a vertical surface, as much as a less rigid tape, such as crinolated or masking tape. This permits the marking tape 10 to be applied along a straight edge or line. The plain paper tape is preferred because it provides a readily markable surface for printing numbers and the like as may be required during use of the tape 10. Lastly, this material, paper, is readily available in a variety of weights and properties, which facilitates the incorporation of the most desirable properties.

The most preferred form of the tape 10 is to use a 60 lbs. weight paper. Such paper is readily available. Grades of paper between 50 lbs. and 80 lbs. may also be used to provide reasonable results.

To form the marking tape 10 requires a number of steps. The first step is to print the relative marking numbers 32 onto the tape. This printing step can be accomplished by conventional inks or the like as known to those skilled in the art. The next step is to apply a release agent to the printed surface. The purpose of the release agent is to allow the adhesive layer to be overlaying over the printed surface, in such a manner that when it is removed, the dye or printing is not removed with the adhesive layer. However, the release agent must be applied in such a manner that the surface of the tape is still readily markable by pens, pencils and the like. Also, the release agent cannot cause the ink to bleed, and thus it must be compatible with it. Most preferably, a liquid release agent is used, such as a polyurethane and water mixture, which is allowed to partially penetrate the paper tape. This is shown at 50 in FIG. 2. As will be appreciated by those skilled in the art, it is not desirable to have the release agent 50 penetrate to the second or bottom surface of the tape as this is surface which is to carry the adhesive layer 14. Most preferably the release agent will be applied in an amount of between 0.5% to 2% by weight solids to water.

The next step in forming the marking tape 10 is to mount or attach an adhesive layer 14 to the bottom or second face of the tape 10. This can be accomplished by conventional means, and an adhesive such as MORSTICK (TM) from Morton International Inc. (Chicago, Ill.) has been found to yield reasonable results. Once the tape has had the adhesive applied, it is then rolled onto a spool or core 58 and made ready for packaging.

A further feature of the present invention can now be understood. Turning to FIG. 2, there are shown an upper score marking 18 and a lower score marking 20. Most preferably, these score markings are formed into the marking tape 10 prior to the adhesive being applied. In some circumstances, it may be necessary to only score the upper surface 12, but in other circumstances it may be desirable to score both the upper and lower surfaces as shown.

The score 18 is formed along the longitudinal axis of the tape 10. The paper from which the body of the tape 10 is formed is preferably sufficiently stiff that it forms a self-supporting fold when bent. This is why the weights noted above are most preferred. At these paper weights, or thickness, self supporting cantilevers of between 1½ and 3½ feet are possible, with 2½ feet being readily achieved. This is another reason for the desirability of the preferred paper choices noted above.

Figure 3:
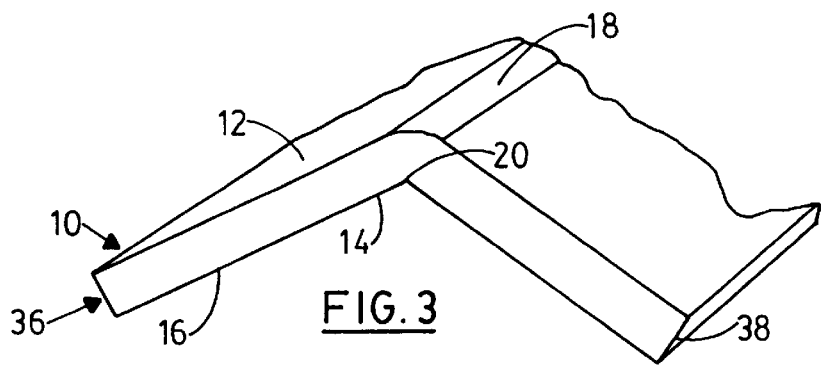
FIG. 3 is a part isometric section of the tape of FIGS. 1 and 2 in an isometric view.

In this manner, the marking tape 10 can be bent to form a tent, as shown in FIG. 3. The score lines 18 and 20 assist in the formation of the tent. Most preferably, the score lines are formed parallel to the side edges of the tape 10 and, most preferably, along the centre line of the tape 10. In this manner, the tape 10 can be folded and easily positioned on a 90° corner of a building material such as a piece of lumber or the like. This facilitates the marking of the material in many circumstances including such purposes as cabinet making.

An additional advantage of forming a tented configuration such as shown in FIG. 3, is that the self-sustaining fold can allow the marking tape 10 to be easily moved on a surface without adhering thereto. This is because, when it sits on edge as shown, the adhesive layer 14 does not substantially contact the surface of the material allowing the tape to be moved thereupon. This is an advantage because the tape can be adhered to the surface once it has been positioned with respect to a zero point or the like. Using adhesive backed tapes can be frustrating, where they attach to a surface prior to being properly positioned. This results in delays and misaligned tape and can be avoided by means of the combination of the score and the self-sustaining fold as taught by the present invention.

Lastly, the tented configuration of FIG. 3 is preferred because it provides some structural rigidity to the tape 10 to allow the tape to be extended beyond the reach of the person desiring to mark a surface with the tape 10. In this tented fashion, it can extended up to the top of a ceiling and pressed there against by means of a paint roller or the like to provide marking. This is not possible with the prior art tapes which are formed from crinolated masking tape, which do not have the required structural integrity to form self-sustaining folds to extend the reach of any potential user as taught by this invention.

Figure 5:
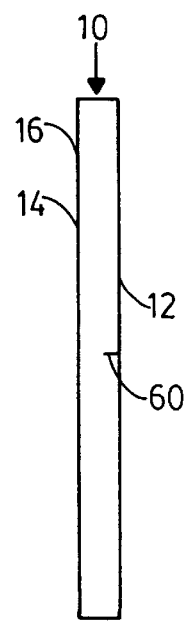
FIG. 5 is an enlarged cross-sectional view of a second embodiment of the invention.

In terms of the score 18 and 20, the most preferred form is a single score on the upper surface. However, depending upon how the score is formed, parallel scores on the upper and lower surface may also function adequately as shown in FIG. 2. The score of FIG. 2 is formed by rolling or pressing a dye into the upper and lower surface of the tape 10. An alternative, is to run a razor cut 60 partially through the tape 10 to form the score as shown in FIG. 5. This alternative is preferred in most cases, as it facilitates forming a sharp edge for the fold line. It will be appreciated that what is required is to cut through enough of the tape to cause enough weakness to direct the fold line, and yet leave enough of the body of the tape 10 to allow a self-sustaining fold to be formed in the balance of the material at the cut line. For different material, having different properties the score line will vary in depth. The depth of penetration should be between 10% and 70% of the thickness of the body and most preferably between 25% and 50% of the body thickness.

It will be appreciated by those skilled in the art that various alterations and modifications can be made to the invention without departing from the spirit of the invention as defined by the appended claims. For example, the score can be either pressed or cut into the upper or lower surface of the tape. What is preferred is to form a guiding feature to form a good fold edge which permits the tape to form the tented self-sustaining folded configuration. Also, while the upper surface is formed with inches and feet in the drawings, other distance markings may be used, such as metric markings.

We claim:

1. A marking tape comprising:
   a body having a first surface and a second surface, the body being comprised of plain paper which is dimensionally stable and rippable, the paper being of the type that is flexible, and sufficiently stiff to retain a fold therein;
   said first surface including a plurality of relative measurement marks made thereon, and carrying a penetrating release agent, said penetrating release agent being compatible with said measurement marks on said first surface; and
   said second surface including an adhesive layer disposed thereon, said adhesive layer adapted to release from said release agent on said first surface without removing said relative measurement marks from said first surface wherein said marking tape may be stored in a roll.

2. The marking tape of claim 1 wherein said release agent penetrates said first surface, and yet leaves sufficient paper fibre exposed to permit pencil marking of said upper surface.

3. The marking tape of claim 2 wherein said release agent provides sufficient release so that said adhesive layer can be removed from an overlying relationship without defacing said relative measurement marks.

* * * * *